Dec. 17, 1968 W. PECOTA 3,417,207

AUTOMATIC DIALING APPARATUS

Filed Nov. 18, 1964 3 Sheets-Sheet 1

INVENTOR.
WALTER PECOTA

BY [signature]

ATTORNEY

Dec. 17, 1968 W. PECOTA 3,417,207

AUTOMATIC DIALING APPARATUS

Filed Nov. 18, 1964 3 Sheets-Sheet 2

INVENTOR.
WALTER PECOTA

BY Charles T. Jacobs

ATTORNEY

INVENTOR.
WALTER PECOTA
BY [signature]
ATTORNEY

United States Patent Office 3,417,207

Patented Dec. 17, 1968

3,417,207

AUTOMATIC DIALING APPARATUS

Walter Pecota, Mountain Lakes, N.J., assignor to G-V Controls Inc., Livingston Township, N.J., a corporation of New Jersey Continuation-in-part of application Ser. No. 382,040, July 13, 1964. This application Nov. 18, 1964, Ser. No. 414,496

16 Claims. (Cl. 179—90)

ABSTRACT OF THE DISCLOSURE

A plurality of digit conductors (*d* in number) and a plurality of address conductors (*c* in number) control an array of *ncd* normally open electric paths, each combination of one digit conductor and one address conductor when contemporaneously activated effecting the closure of a respective *n* of the paths. As an incident to activation of an address conductor the digit conductors are successively activated thereby successively to close, *n* at a time, *nd* of the paths. Such closures render means effective to variously interconnect the terminals of an electrical system which transmits integer-representing signals as determined by the terminal interconnection.

This application is a continuation-in-part of my copending application Ser. No. 382,040, filed July 13, 1964, which has been abandoned since the filing of this application.

This invention relates to automatic dialing apparatus, and more particularly to dialing apparatus by which a multi-digit telephone address may be dialed in response to the manipulation of a single control—e.g. the depression of a single button. The term "telephone address" is used herein to denote what is commonly referred to as "telephone number," in order to avoid confusion with the use herein of the word "number" in its elementary sense. The term "dialing" is used in the broad sense of commanding a connection with the telephone at a particular telephone address, without limitation to the specific sense of manipulating a dial at such.

There is in use manual dialing apparatus provided with a bank of integer-representing buttons, typically ten in number, with which a multi-digit telephone address may be dialed by successive depression of the buttons respectively corresponding to the successive integers of that adress—e.g., if that address be 112–3580, by successive depression of the buttons labelled "1," "1," "2," "3," "5," "8" and "0." Such apparatus is of a variety of types; in general, however, each of those types involves the use of an electrical system, for the selective transmission of a number of respective-integer-representing signals, which includes a plurality of variously interconnectible terminals, it being the particular interconnection of those terminals existing at any time which determines the integer which will at that time be represented by the signal transmitted from that electrical system.

The procedure of successive depression of *d* buttons (*d* being the number of digits to be dialed—in the example just given, seven), obviously affords the opportunity to dial any desired telephone address whatever of *d* digits. It does, however, impose on the user a burden which is far greater and which, except in the hands of a telephone operator or other person who by constant dialing develops unusual proficiency, is far slower and more prone to error, than that which would be imposed by a need to depress only one button for a given telephone address. There are many specialized commercial or professional situations in which the vast majority of calls are made to a limited number only of telephone addresses, or in which (e.g. in a 2- or even a 3-digit PBX or other intercommunication system) the total number of telephone addresses to be dealt with is finite. In either of these situations the overall burden on the user may be greatly reduced, speed greatly increased and propensity to error minimized, by the use of automatic apparatus which causes the successive dialing of all *d* digits of a telephone address in response to the depression of a single button (or the like) appropriate to that address—such apparatus being permissably supplemented by the manual apparatus above described, so that any telephone address not provided for by a respective single button may still be dialed manually. It is to the provision of such automatic apparatus that this invention is particularly directed.

While not in all aspects limited thereto, the invention has especial utility and has been employed with great success in connection with an electrical system (such as is now available to telephone subscribers in certain communities) in the form of a tone-dialing oscillator, in particular one which is arranged to transmit a dual-frequency tone and in which the terminals abovementioned are arranged in two sets, the interconnections of the terminals of each set determining a respective one of the two frequencies of that tone.

In one aspect the invention comprises, in combination with an electrical system such as above described, *d* (*d* being a plural integer) digit conductors; *c* (*c* being a plural integer) selectively activatable address conductors; *ncd* (*n* being an integer) normally open electrical paths under the control of said digit conductors and said address conductors, each combination of one digit conductor and one address conductor when contemporaneously activated effecting the closure of a respective *n* of said paths; means, actuated as an incident to activation of one of the address conductors, for successively activating the digit conductors in a predetermined sequence; and terminal-interconnecting means, with which the paths are selectively connected to render those terminal-interconnecting means effective in accordance with closures of those paths, for establishing preselected interconnections of the terminals of the first-mentioned electrical system.

Various more detailed aspects are comprised in the invention. Thus there may be provided means, connected with the digit-conductor-activating means and responsive to the completion of its operation, for de-activating the previously activated address conductor.

The electrical system abovementioned may be a tone-dialing audio-frequency oscillator and the interconnection of its terminals above referred to may determine its tone output. Its terminals may comprise *s* (*s* being a plural integer) sets each of a plurality of variously interconnectible terminals, and *n* above referred to may equal *s*. There may if desired be provided means to which a selected one of the paths may be connected for disabling the oscillator during the closure of that selected path, or both during that closure and during any remainder (after that closure) of the sequence of digit-conductor activation.

A pulse generator may be provided, and the means for sucessively activating the digit conductors may comprise electronic-stepping-switch means timed by that pulse generator. There may be provided means, timed by the pulse generator in multiple with the electronic-stepping-switch means, for periodically activating and deactivating the oscillator. Telephone receiver and transmitter elements may be locally connected with the oscillator and there may be provided means, timed by the pulse generator in multiple with the electronic-stepping-switch means, for altering the efficiency of action of at least one of those elements. There may be interposed between the pulse generator and the oscillator-activating and -deactivating means a means for retarding the timing of the latter relative to that of the electronic-stepping-switch means.

Allied and other objectives and aspects of the invention will appear from the following detailed description and the appended claims.

In that detailed description reference is had to the accompanying drawings, in which:

FIGURE 3 is a schematic diagram of a typical tone-dialing oscillator which may form the electrical system above referred to.

Figure 1:
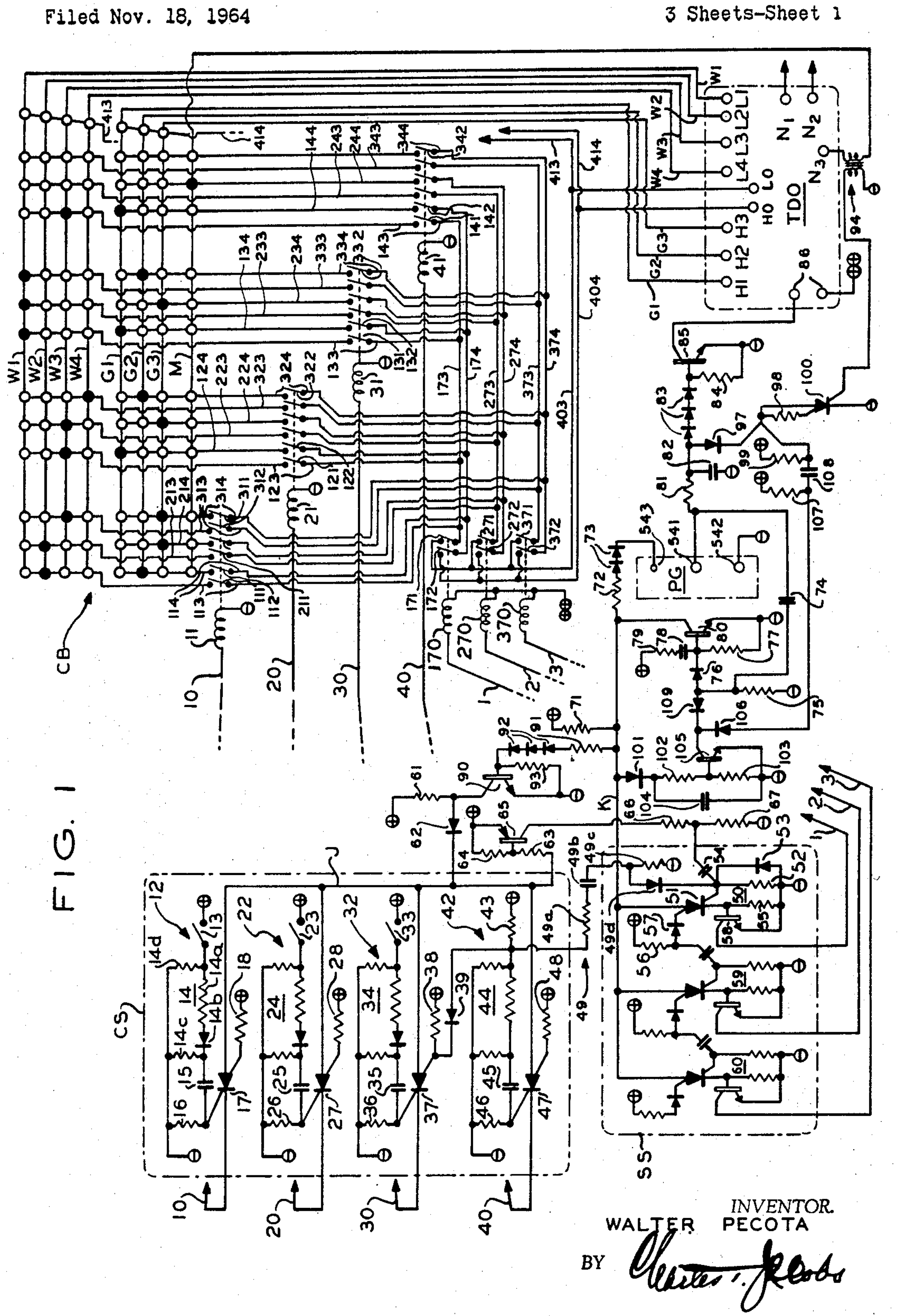
FIGURE 1 is a schematic diagram of one embodiment of an automatic dialing apparatus according to the invention, the electrical system whose terminals are to be variously interconnected and the pulse generator each being indicated by a respective box.
Figure 3:
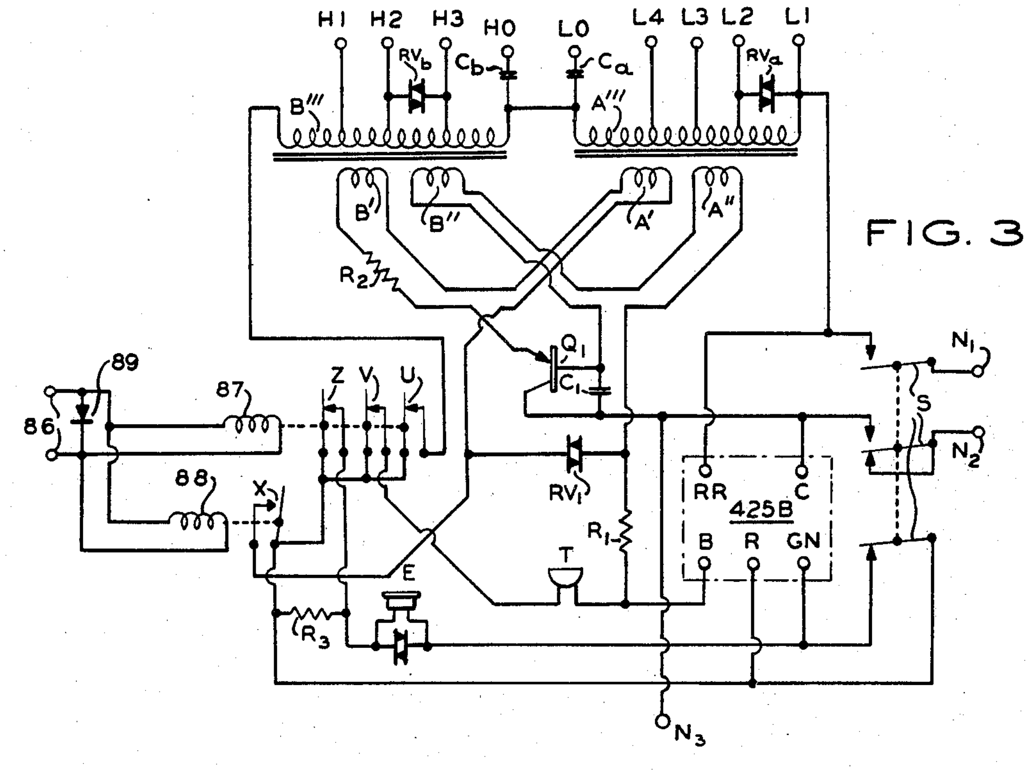

Since in the embodiment of FIGURE 1 the electrical system above referred to is a tone-dialing audio-frequency oscillator, such an oscillator may first be briefly described. In principle such an oscillator could generate ten different single-frequency tone outputs, then being provided for example with a single set of variously interconnectible terminals whose interconnections would determine the oscillator's tone output. In practice it has been found by others that a preferable approach is to cause the oscillator to generate dual-frequency tone outputs, the oscillator then being typically provided with two sets of variously interconnectible terminals—the interconnections of the terminals of the first set determining the lower-frequency component, and the interconnections of those of the second set determining the higher-frequency component, of the tone output. A typical design of such an oscillator has been detailedly described in an article by J. H. Ham and F. West of Bell Telephone Laboratories, Inc. presented at the A.I.E.E. Winter General Meeting of January–February 1962 as Paper No. 62–227. In FIGURE 3 of the drawings I show an oscillator of design essentially similar to that of FIGURE 3 of that article, integrated with the transmitter T and the receiver or earphone E of a standard telephone set.

It will be understood that if *s* be the number of sets of variously interconnectible terminals, then *s* in the tone-dialing oscillator illustrated in FIGURE 3 will be two.

Briefly, the positive and negative conductors of the telephone line are connected to respective terminals $N_1$ and $N_2$ and, when the cradle switch S is closed, to respective terminals RR and C on the conventional network 425B, under which circumstances the network terminal B will inter alia be somewhat more positive than $N_2$ and the network terminal R will inter alia be still more positive. A p-n-p transistor $Q_1$, whose collector is connected to the negative terminal C, is the amplifying element of the oscillator. The requisite feedback is provided by two ferrite-core transformers whose primaries B′ and A′ and a resistor $R_2$ are serially connected between the emitter of $Q_1$ and the network terminal R, and whose secondaries B″ and A″ and a resistor $R_1$ are serially connected between the base of $Q_1$ and the network terminal B. A capacitor $C_1$ is connected between the base and the collector of $Q_1$, and a varistor $RV_1$ is connected between the primary and secondary returns (embracing $R_2$ but not $R_1$). The oscillator is of course intended to function only during the action of tone dialing; to place it otherwise out of operation the primary return is brought through a pair X of normally open contacts which will be closed only during each tone output.

The tuning of the lower-frequency component of the oscillator output is accomplished in the circuit of a tertiary winding A‴ provided on the first transformer, and that of the higher-frequency component in the circuit of a tertiary winding B‴ provided on the second transformer, these tertiaries being connected in series with each other. Each of the two tertiaries is provided with three taps, and in each instance the tuning is effected by connecting a capacitor between the junction of the tertiaries and a selected one of the taps or, in the case of the tertiary A‴, alternatively across the entire tertiary. A capacitor for tuning the tertiary A‴ is shown as C*a* and one for tuning the tertiary B‴ as C*b*. A first terminal of each is connected to the junction joining the two tertiaries; tuning of the lower-frequency component then requires simply the connection of the second terminal of C*a* to one of the taps on A‴ or alternatively to its non-common extremity, while tuning of the higher-frequency component requires simply the connection of the second terminal of C*b* to one of the taps on B‴.

The non-common extremity of A‴ may be connected to a terminal L1, the adjacent tap to a terminal L2, the next tap to a terminal L3 and the remaining tap to a terminal L4; the tap on B‴ nearest its non-common extremity may be connected to a terminal H1, the next tap to terminal H2 and the remaining tap to a terminal H3. To tune the lower-frequency component to its lowest frequency terminal L0 may be connected to terminal L1, to tune that component to the next higher frequency L0 may be connected to terminal L2, to tune to the next higher frequency L0 may be connected to terminal L3, and to tune the lower-frequency component to its highest frequency L0 may be connected to terminal L4; to tune the higher-frequency component to its lowest frequency H0 may be conected to terminal H1, to tune that component to its intermediate frequency H0 may be connected to terminal H2, and to tune that component to its highest frequency H0 may be connected to terminal H3. Thus L0 and L1 and L4 form one set of terminals to be variously interconnected, while H0 and H1 through H3 form a second set of terminals to be variously interconnected, to determine the oscillator's dual-frequency tone output.

As brought out in the article above referred to, the oscillation of the oscillator at two frequencies simultaneously is made possible by removing from the transistor $Q_1$ the task of amplitude limitation of the oscillations and thus permitting that transistor to operate over an essentially linear portion of its characteristic, and by otherwise and separately performing the amplitude-limiting tack for each of the two frequency components. As in the disclosure of that article, amplitude limitation for the lower-frequency component may be effected by a varistor RV*a* shunted between the non-common extremity of tertiary A‴ and the adjacent one of the taps, and for the higher-frequency component may be effected by a varistor RV*b* shunted between the first and second taps of B‴ (reckoned from the common terminal).

For purposes later apparent it may be desirable to provide on the oscillator a terminal $N_3$ which will be connected with the negative terminal $N_2$ when the cradle switch S is closed.

In the normal use of the telephone the earphone E is to be connected directly across the network terminals R and GN, but during the operation of the oscillator it is desirable that this connection be through an attenuating resistor $R_3$; accordingly the connection of the earphone across the network terminals is made through $R_3$, but that resistor is normally shorted out by a pair Z of normally closed contacts which will be opened during operation of the oscillator. In the normal use of the telephone the transmitter T is connected directly across the network terminals R and B, but during the operation of the oscillator it is desirable that this connection be open-circuited; accordingly the connection of the transmitter across the network terminals is made through a pair V of normally closed contacts which will be opened during operation of the oscillator. In order to shock-excite each of the tuned circuits formed by the tertiaries A‴ and B‴ with the capacitors which will have been respectively shunted across selected portions of each (by interconnection of L0 with one of the terminals L1 through L4 and of H0 with one of the terminals H1 through H3), it is desirable that at the inception of a tone output there be interrupted a direct current otherwise flowing through those tertiaries; to provide for such a current the tertiaries may be serially connected between network terminals RR and R, and to provide for such interruption this connection may be made through a pair U of normally closed contacts which will be opened during operation of the oscillator.

As brought out in the references to which the article abovementioned refers, the frequencies made available for the lower-frequency component of the oscillator output may desirably be approximately 697, 770, 852 and 941 cycles per second, and those made available for the higher-frequency component may desirably be approximately 1,209, 1,336 and 1,477 cycles per second. As further there brought out, pairs of those frequencies may be used to signify various integers in accordance with the following:

| For the integer | Terminals connected to L0 and H0 | | Lower frequency | Higher frequency |
|---|---|---|---|---|
| 1 | L1 | H1 | 697 | 1,209 |
| 2 | L1 | H2 | 697 | 1,336 |
| 3 | L1 | H3 | 697 | 1,477 |
| 4 | L2 | H1 | 770 | 1,209 |
| 5 | L2 | H2 | 770 | 1,336 |
| 6 | L2 | H3 | 770 | 1,477 |
| 7 | L3 | H1 | 852 | 1,209 |
| 8 | L3 | H2 | 852 | 1,336 |
| 9 | L3 | H3 | 852 | 1,477 |
| 0 | L4 | H2 | 941 | 1,336 |

When the oscillator is performing its function of generating simultaneously oscillations of the two frequencies, its dual-frequency output appears across the terminals $N_1$ and $N_2$ and will be impressed across the telephone line connected to those terminals. If by the oscillator there be generated a series of dual-frequency tone outputs portraying a multi-digit number to be dialed, then through the intermediary of remote telephone-equipment circuitry itself known and forming no part of the present invention that number will be tone-dialed.

Except as specifically noted above, the foregoing description with respect to FIGURE 3 presents information contained in the article above referred to (to which reference may be had for further details) and is presented not to describe the present invention but rather to explain a typical environment with which it may be utilized.

Figure 2:
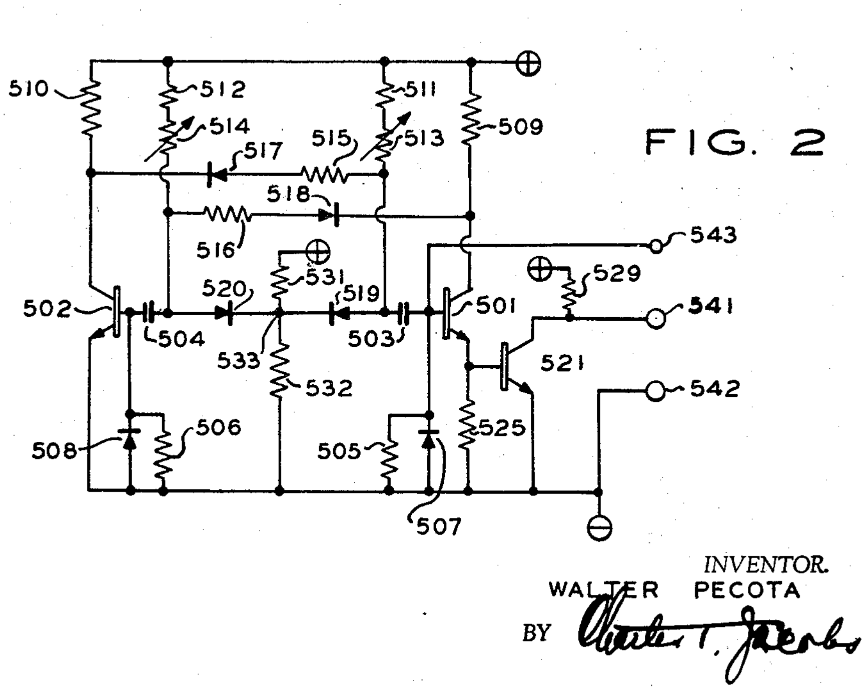
FIGURE 2 is a schematic diagram of a typical pulse generator such as referred to above.

A typical embodiment of my invention itself is illustrated in FIGURE 1, in combination with the above-described tone-dialing oscillator of FIGURE 3 (which in FIGURE 1 appears simply as a box designated TDO, with terminals designated and arranged similarly ot those of FIGURE 3). In FIGURE 1 one other circuit component—a pulse generator with one-stage amplifier—also is shown as a box, designated PG, and typical internal circuitry of that pulse generator is shown in FIGURE 2 hereinafter described. The apparatus of FIGURE 1 is intended to be powered by a D.C. supply (not shown) which provides an unregulated positive potential (typically 26 volts) and a lower regulated positive potential (typically 15 volts). For simplicity circuit points intended to be connected to the negative terminal of that supply are terminated in a single small circle containing a "—," circuit points intended to be connected to the regulated positive potential are terminated in a single small circle containing a "+," and circuit points intended to be connected to the unregulated positive potential are terminated in a pair of side-by-side small circles each containing a "+." Otherwise than as stated in this paragraph, FIGURE 1 is a complete schematic illustration in its own right.

While the invention may be arranged to tone-dial telephone addresses each of any number *d* digits, FIGURE 1 for simplicity illustrates that number *d* as three. The invention makes use of a number *c* of address conductors each of which is normally utilizable for the tone-dialing of a respective preselected telephone address, but there may be special cases wherein a particular telephone address to be tone-dialed has a number of digits greater than *d* and then more than one address conductor will be utilized for the tone-dialing of that designation; FIGURE 1 arbitrarily illustrates the number *c* as four, but with two of the four address conductors utilized for the tone-dialing of one telephone address of more than *d* digits (so that the number of telephone addresses available to be tone-dialed with the particular illustration of FIGURE 1 is three).

For the first digit, whatever the integer of which it in any particular telephone address may consist, there is provided a digit conductor 1, for the second digit there is provided a digit conductor 2, and for the third digit there is provided a digit conductor 3 (and more would be provided to increase the number of digit conductors to *d* if that were more than the illustrated three). For the tone-dialing of a first telephone address to be preselected, there is provided an address conductor 10; for the tone-dialing of a second telephone address to be preselected, there is provided an address conductor 20; for a third telephone designation to be preselected, there is provided an address conductor 30; and there is provided a fourth address conductor 40 which could be appropriate to a fourth telephone address to be preselected, but in the illustrated embodiment is employed to increase the number of digits of which the third telephone address may be composed.

With each available combination of one digit conductor and one address conductor there may be electrically associated a number *n* of paths. The number *n* will, of course, be at least one, and would desirably be one if the number *s* (above defined) were one. In the illustrated embodiments of the inventions is (as above noted) two, and in the particular circuitry illustrated in that embodiment it is convenient to make *n* equal to *s*—i.e., two.

Thus for the combination of digit conductor 1 and address conductor 10 there may be provided two paths 113 and 114. Electrically to associate these paths with the digit conductor 1 they may respectively include pairs 171 and 172 of contacts which are normally open but are closed, upon activation of the digit conductor 1, by the action of a relay 170 in which those contact pairs are comprised and whose coil is connected to that conductor. Electrically to associate the paths 113 and 114 with the address conductor 10 they may respectively include pairs 111 and 112 of contacts which are normally open but one closed, upon activation of the address conductor 10, by the action of a relay 11 in which these contact pairs are comprised and whose coil may be connected between that conductor and the negative supply potential.

For the combination of digit conductor 2 and address conductor 10 there may be provided two paths 213 and 214. Electrically to associate these paths with the digit conductor 2 they may respectively include pairs 271 and 272 of contacts which are normally open but are closed, upon activation of the digit conductor 2, by the action of a relay 270 in which those contact pairs are comprised and whose coil is connected to that conductor. Electrically to associate the paths 213 and 214 with the address conductor 10 they may respectively include pairs 211 and 212 of contacts which are normally open but are closed, upon activation of the address conductor 10, by the action of relay 11 abovementioned of which those contact pairs form additional parts.

For the combination of digit conductors 3 and address conductor 10 there may be provided two paths 313 and 314. Electrically to associate these paths with the digit conductor 3 they may respectively include pairs 371 and 372 of contacts which are normally open but are closed, upon activation of the digit conductor 3, but the action of a relay 370 in which those contact pairs are comprised and whose coil is connected to that conductor. Electrically to associate the paths 313 and 314 with the address conductor 10 they may respectively include pairs 311 and 312 of contacts which are normally open but are closed, upon activation of the address conductor 10, by the action of relay 11 abovementioned of which those contact pairs form still additional parts.

There have thus been described *nd* (i.e., six, *n* being two and *d* being three) paths 113, 114, 213, 214, 313 and 314 associated with address conductor 10, through the medium of *nd* respective contact pairs (111, 112 . . . 312) all forming parts of relay 11; the *n* paths 113 and 114 are associated with digit conductor 1 through the respective contact pairs 171 and 172, the *n* paths 213 and 214 are associated with digit conductor 2 through the respective contact pairs 271 and 272, and the *n* paths 313 and 314 are associated with digit conductor 3 through the respective contact pairs 371 and 372. In an entirely corresponding manner *nd* paths 123, 124, 223, 224, 323 and 324 are associated with address conductor 20 through the medium of *nd* respective contact pairs (121, 122 . . . 322) all forming parts of relay 21; the *n* paths 123 and 124 are associated with digit conductor 1 through the abovementioned contact pairs 171 and 172 respectively, the *n* paths 223 and 224 are associated with digit conductor 2 through the abovementioned contact pairs 271 and 272 respectively, and the *n* paths 323 and 324 are associated with digit conductor 3 through the abovementioned contact pairs 371 and 372 respectively. Again in an entirely corresponding manner *nd* paths 133, 134, 233, 234, 333, 334 are associated with address conductor 30 through the medium of *nd* respective contact pairs (131, 132 . . . 332) all forming parts of relay 31; the *n* paths 133 and 134 are associated with digit conductor 1 through the abovementioned contact pairs 171 and 172 respectively, the *n* paths 233 and 234 are associated with digit conductor 2 through the abovementioned contact pairs 271 and 272 respectively, and the *n* paths 333 and 334 are associated with digit conductor 3 through the abovementioned contact pairs 371 and 372 respectively. Finally in a quite corresponding manner *nd* paths 143, 144, 243, 244, 343 and 344 are associated with address conductor 40 through the medium of *nd* respective contact pairs (141, 142 . . . 342) all forming parts of relay 41; the *n* paths 143 and 144 are associated with digit conductor 1 through the abovementioned contact pairs 171 and 172 respectively, the *n* paths 243 and 244 are associated with digit conductor 2 through the abovementioned contact pairs 271 and 272 respectively, and the *n* paths 343 and 344 are associated with digit conductor 3 through the abovementioned contact pairs 371 and 372 respectively.

Each of the *c* paths 113, 123, 133 and 143 may include some portion of a common conductor 173 through which it is connected to a first contact of the pair 171, each of the *c* paths 114, 124, 134 and 144 may include some portion of a common conductor 174 through which it is connected to a first contact of the pair 172 and so on, as illustrated by the further common conductors 273, 274, 373 and 374. All of the *cd* paths 113, 213, 313, 123, 223, 323, 133, 233, 333, 143, 243 and 343 may include a common conductor 403 connected to the second contact of each of the pairs 171, 271 and 371, while the remaining *cd* paths (having numbers respectively higher by 1) may include a common conductor 404 connected to the second contact of each of the pairs 172, 272 and 372. As will be understood, each of the *ncd* paths as above described extends from above its respective upper contact pair (e.g. 111, 112, 211 . . . 342) to below its lower contact pair (e.g. 171, 172 . . . 372).

The result of the above described arrangements is that each of the *ncd* paths above described will be effectively closed upon, but only upon, the activation of both that one address conductor and that one digit conductor with which in combination that path is electrically associated. In other words that path is under the control of that one digit conductor and that one address conductor, and those conductors when contemporaneously activated effect the closure of that path.

Means are provided to activate a desired one of the *c* (e.g. four) address conductors 10, 20, 30 and 40. Such means may be comprised in an address selector schematically illustrated, under the designation CS, in FIGURE 1, in which there may be provided a conductor J to which there may be two paths from regulated positive potential—one through a relatively low-valued resistor 61 and a diode 62, the other through two serially arranged relatively high-valued resistors 64 and 63. For the illustrated four address conductors the address selector may comprise four selector units 12, 22, 32 and 42, of which the selector unit 12 may first be described.

Through a switch 13 operable at will a network 14 may be connected between conductor J and negative supply potential; this network may for example comprise serially a resistor **14*a*, a diode 14*b* and a resistor 14*c*, all of which may be shunted by a resistor 14*d*. Between conductor J and address conductor 10 there may be placed the anode-cathode path of a silicon controlled switch (that term being hereinafter abbreviated "SCS") 17. Between the junction of diode 14*b* with resistor 14*c* and the negative supply potential there may be serially connected a capacitor 15 and a resistor 16, and the cathode gate of SCS 17 may be connected to the junction joining 15 and 16; the anode gate of the SCS 17 may be connected to regulated positive supply potential through a resistor 18. (Simply in order to perform its basic function the network 14 need not be as elaborate as the form illustrated and described, but that form has been found desirable in order to render the address selector reasonably proof against unfavorable influence by transients which may unavoidably be present in the D.C. supply or may be capacitatively impressed on the conductor between switch 13** and the network.)

In operation, if the switch 13 be momentarily closed a potential equal to regulated positive supply potential will be abruptly impressed across the network 14, and a substantial voltage will be abruptly developed across the resistor **14*c*. The wavefront incident to the latter will be impressed through capacitor 15 on the cathode gate of SCS 17; since the anode of that SCS is effectively connected to regulated positive supply potential at least through the resistors 63 and 64 that SCS is in condition to be fired, and it will be fired by this wavefront impression. The result of its firing will be the conduction of current through resistor 61 and diode 62 to conductor J and from that conductor through the SCS 17 and address conductor 10 to and through the coil of relay 11—this current activating that address conductor and of course being more than sufficient to insure the reliable operation of the relay 11**.

Each entirely similar to the selector unit 12 may be the selector units 22 and 32 and, were it not for the abovementioned illustrative intention to utilize selector unit 42 for additional digits of a telephone address for which the *d* digits of selector unit 32 are insufficient, also that selector unit 42—the designations of the components in each successive selector unit being progressively increased by 10. In view of that illustrative intention selector unit 42 comprises, in place of a switch corresponding to 13, a resistor 43, and from its network 14 there is omitted any diode corresponding to **14*b*; further comments as to selector unit 42** are made hereinafter.

In operation, once the SCS of any of the selector units 12, 22, 32 and 42 is fired and thus rendered conductive it will remain conductive until the performance of an act deliberately designed to terminate that conductivity; the performance of such an act at an appropriate time is contemplated, and it and the means for accomplishing it are hereinafter described.

Means are provided to cause the digit conductors, once conductor 1 has been activated, to be activated in the predetermined sequence which (including conductor 1) is 1, 2, 3. Such means may comprise a stepping switch (preferably electronic) of which a preferred form is schematically illustrated under the designation SS in FIGURE 1, and in which there may be provided a conductor K connected to regulated positive supply potential through a resistor 71. Such a stepping switch may comprise a number *d* of stages 50, 59 and 60, of which the first stage may first be described.

Between the conductor K and the negative supply potential there may be connected the anode-cathode path of an SCS 51 and a resistor 55. Between the cathode gate of the SCS 51 and that negative supply potential there may be connected a resistor 52 (across which a diode 53 may be shunted to preclude the development of excessive reverse potentials between cathode gate and cathode). An input capacitor 54 may lead to the cathode gate of 51 from other circuitry hereinafter to be described. From regulated positive supply potential to the anode gate there may be connected serially a resistor 56 and a diode 57. Across the resistor 55 there may be connected the base-to-emitter path of an n-p-n transistor 58 to whose collector there may be connected the digit conductor 1, to which it was above disclosed that the coil of relay 170 would be connected—the far extremity of that coil (along with the far extremities of the coils of relays 270 and 370) being connected to unregulated positive supply potential.

Each of the second and third stages of the stepping switch SS, designated respectively as 59 and 60, may be similar to the first stage as above described, excepting (i) that neither need contain a diode corresponding to 53 of the first stage, and (ii) the input capacitor of each of those stages is connected from the junction joining the resistor and the diode which lead to the anode gate of the preceding stage (e.g. the junction joining 56 and 57 in the first stage 50).

An adjunct of the stepping switch SS is a pulse generator (desirably with one-stage amplifier); such a generator, designated as PG, is shown in FIGURE 1 simply as a box with two main output terminals 541 and 542, the latter being connected to negative supply potential, and with a third terminal 543 which, when there is applied to it a voltage substantially more positive than negative supply potential, quells or "squelches" the pulse generator. Typical intern circuitry of PG is shown in FIGURE 2 and is hereinafter detailedly described; it is sufficient at this juncture, however, to note that while the pulse generator remains squelched the potential of the output terminal 541 will be substantially negative supply potential, that forthwith upon de-squelching that output-terminal potential will abruptly rise to many volts more positive than negative supply potential and will there remain for a first period typically of 50 milliseconds, that at the end of that period that output-terminal potential will abruptly drop back to substantially negative supply potential and will there remain for an interval typically of 50 milliseconds, that at the end of that interval that output-terminal potential will abruptly rise again—and so on in a series of 50-millisecond positive pulses separated by 50-millisecond intervals, until the pulse generator is re-squelched by the reappliaction to terminal 543 of a sustained voltage substantially more positive than negative supply potential.

The squelch terminal 543 may be connected to the conductor K mentioned above, through a resistor 72 and one or more diodes 73; so long as only infinite or high impedance intervenes between the conductor K and negative supply potential—which is the case in the quiescent contion of the apparatus—the conductor K will be at a potential close to regulated positive supply potential, and by the above-described connection of it to the terminal 543 there will then be applied to that terminal a squelching potential.

Between the output terminal 541 to the pulse generator and negative supply potential there may be serially connected a capacitor 74 and a resistor 75, and across the resistor 75 there may be serially connected a diode 76 and a resistor 77; across the resistor 77 there may be connected the base-to-emitter path of a n-p-n transistor 80 of which the collector is connected to the conductor K. The result of the circuitry described in this paragraph is that each time the terminal 541 abruptly rises in potential—i.e. at the beginning of each positive pulse from the pulse generator—the transistor 80 (i.e. its collector-to-emitter path) will be momentarily rendered conductive.

The application of a positive wavefront to the cathode gate of the SCS 51, through the input capacitor 54, will trigger the operation of the apparatus described in the last preceding six paragraphs, the initial result of that application being to fire SCS 51 so that current flows from conductor K to negative supply potential through that SCS and through the base-to-emitter path of transistor 58 (whose collector-to-emitter path is thus rendered conductive.) This SCS firing reduces the potential of conductor K to little over a volt above negative supply potential, thus de-squelching the pulse generator to result forthwith in the first positive pulse at terminal 541. (Simultaneously with the onset of the first pulse there will tend to occur, as brought out in the last preceding paragraph, a momentary conductivity of the transistor 80 but this occurrence, in connection with the first pulse only, is foreclosed by means hereinafter described.)

The conductivity of SCS 51 and of transistor 58 will persist throughout the 50-millisecond first pulse and throughout the succeeding 50-millisecond inter-pulse interval. At the onset of the second pulse there will occur a momentaary conductivity of transistor 80, which momentarily will divert sufficient current from SCS 51 so that the remnant current through the latter falls to less than holding current, causing that SCS to extinguish and the associated transistor 58 to resume its normally non-conductive state. That SCS extinguishment causes the anode gate of that SCS, and thus the junction joining resistor 56 and diode 57, to execute an abrupt rise in potential, and the resulting positive wavefront at that junction is applied through the input capacitor of the stepping-switch stage 59 to result in the firing of that stage's SCS and conductivity of that stage's transistor. The conductivity of the second-stage SCS and transistor will persist throughout the 50-millisecond second pulse and the succeeding 50-millisecond interval—but at the onset of the third pulse that SCS will be extinguished and that transistor rendered again non-conductive, and the third stage's SCS will be fired and its transistor rendered conductive, in correspondence to the action above described for the second stage. At the onset of the fourth pulse the third-stage SCS will be extinguished and the third-stage transistor rendered again non-conductive; since there remains in the illustrated stepping switch no further stage and thus no further SCS to be fired, the potential of conductor K will thereupon rise to near regulated positive supply potential, thus re-squelching the pulse generator.

It will thus be understood that for the first 100 milliseconds following the application of a positive wavefront to the cathode gate of SCS 51 the first-stage transistor 58 will be conductive and digit conductor 1 thus brought to near negative supply potential, for the second 100 milliseconds the transistor of the second stage 59 will be conductive and digit conductor 2 thus brought to near negative supply potential, and for the third 100 milliseconds the transistor of the third stage 60 will be conductive and digit conductor 3 thus brought to nearly negative supply potential. The quiescent potential of each of those digit conductors being unregulated positive supply potential (to which the coils of relays 170, 270 and 370 are connected), this successive bringing of those conductors to near negative supply potential constitutes a successive activation of those conductors.

This completes the basic description of both apparatus and operation of the means itself for successively activating the digital conductors in a predetermined sequence.

That means is subjected to control by any one of the address conductor-activating means (e.g. switches 13, 23, 33) and is actuated as an incident to activation of any of the address conductors. For any one of the selector units 12, 22 and 32 this may be facilitated by the use of a common p-n-p transistor 65 whose emitter is connected to regulated positive supply potential, whose collector is connected to negative supply potential through two serially arranged resistors 66 and 67, and whose base is connected to the junction of the above-mentioned two serially arranged resistors 63 and 64 connected between conductor J and regulated positive supply potential. The stepping-switch input capacitor 54 is connected to the junction of 66 and 67. Quiescently conductor J is at regulated positive supply potential, no current flows through resistors 63 and 64, and transistor 65 is non-conductive—but closure of any of the switches 13, 23 and 33 to activate the respective address conductor, since it causes the potential conductor J to drop suddenly and substantially, will result in an abruptly rising current through resistor 63 and the base-to-emitter path of transistor 65, rendering that transistor conductive and causing an abruptly rising current through resistors 66 and 67 and thus an abrupt voltage development across 67. From this voltage a positive wavefront is applied through input capacitor 54 to trigger the stepping switch and thus to invoke the action of the means for successively activating the digit conductors in predetermined sequence. This successive activation, occurring while one of the address conductors stands activated, will of course result in the successive closure, *n* (e.g. two) at a time, of the *nd* (e.g. six) paths which are under the control of that address conductor and of those *d* (e.g. three) digit conductors.

Attention may now be directed to the means which are provided to establish preselected interconnections of the terminals of the sets L0-L1-L2-L3-L4 and H0-H1-H2-H3 and thus to tune the two frequencies of the tone output of the tone-dialing oscillator TDO–the *ncd* paths above described being selectively connected with those interconnection-establishing means to render those means effective in accordance with closures of those paths.

In the illustrated embodiment of the invention the interconnection-establishing means may comprise seven conductors W1, W2, W3, W4, G1, G2 and G3 respectively leading from the oscillator terminals L1, L2, L4, H1, H2 and H3; 4*cd* connection points each providing for the connection of one of the four conductors W1, W2, W3 and W4 with one of the *cd* paths 113, 213, 313, 123, 223, 323, 133, 233, 333, 143, 243 and 343; and 3*cd* connection points each providing for the connection of one of the three conductors G1, G2 and G3 with one of the *cd* paths 114, 214, 314, 124, 224, 324, 134, 234, 334, 144, 244 and 344. These 7*cd* connection points—together with another *cd* connection points by which a conductor M hereinafter described may be connected at will with any of the lastmentioned *cd* paths—may conveniently form a crossbar arrangement, and are collectively designated as CB. In FIGURE 1 each connection point is illustrated as a circle intersected horizontally by the respective conductor and intersected vertically by the respective path; a white interior of any circle designates non-connection, and a black interior of any circle designates connection, at the point represented by that circle.

Individually each connection point, among those thus far described, may be identified by the designations, used hyphenatedly, of the conductor and of the path whose connection to each other it provides for—e.g. the top most lefthand one may be designated as "W1–113," the next-to-bottom most righthand one as "G3–344," and the bottom most righthand one as "M–344" (these designations, being readily determinable from the conductor and path designations appearing in FIGURE 1, having been themselves withheld from application in that figure to avoid obscurement of the illustration).

Subject to later qualification in connection with the description of function of the conductor M, it is contemplated that each of the *cd* odd-numbered paths will be connected to some one of the four conductors W1, W2, W3 and W4, and that each of the *cd* even-numbered paths will be connected to some one of the three conductors G1, G2 and G3. The selection of the W and G conductors to which there will be connected the paths having designations whose second or middle symbol is "1" will be made in accordance with the telephone address desired to be tone-dialed upon activation of address conductor 10, that of the conductors to which there will be connected the paths having designations whose second or middle symbol is "2" will be made in accordance with the telephone address desired to be tone-dialed upon activation of address conductor 20, and so on. Of any such telephone address the integer of which the first digit consists will control the W and G conductor selections for the paths having designations whose first symbol is "1," the integer of which the second digit consists will control the conductor selections for the paths having designations whose first symbol is "2," and so on.

This may be illustrated, in connection with the first and second address conductors or selector units, by assuming arbitarily that upon at least momentary closure of the first unit switch 13 it is desired to tone-dial the telephone address "569," and that upon at least momentary closure of the second-unit switch 23 it is desired to tone-dial the telephone address "790." For the first, it is readily determined from the tabulation early above that in tuning of the oscillator TDO appropriate to the integer "5" its terminals L0 and H0 should be connected to its terminals L2 and H2 respectively, in tuning appropriate to "6" L0 and H0 should be connected to L2 and H3 respectively, and in tuning appropriate to "9" L0 and H0 should be connected to L3 and H3 respectively; thus in the interconnection-establishing means CB path 113 would be connected to conductor W2 and path 114 to G2, path 213 would be connected to conductor W2 and path 214 to G3, and path 313 would be connected to W3 and path 314 to G3. For the second, in tuning of the oscillator appropriate to the integer "7" terminals L0 and H0 should be connected to terminals L3 and H1 respectively, in tuning appropriate to "9" L0 and H0 should be connected to L3 and H3 respectively, and in tuning appropriate to "0" L0 and H0 should be connected to L4 and H2 respectively; thus in the interconnection-establishing means CB path 123 would be connected to conductor W3 and path 124 to G1, path 223 would be connected to conductor W3 and 224 to G3, and path 323 would be connected to W4 and 324 and G2. Those connections—which constitute selective connections of the paths 113, 114, 213, 214, 313, 314, 123, 124, 223, 224, 323 and 324 to render the interconnection-establishing means effective in accordance with the closures of those paths—have been by way of example indicated in FIGURE 1.

In the specific arrangements thus described each of the interconnections (between L0 and one of L1 through L4, and between H0 and one of H1 through H3) which tunes the oscillator is an interconnection serially including one of the *ncd* paths above described (113, 114, 213 . . . 344). It is, however, to be understood that in its broader aspects my invention is not limited to such serial inclusion. Note is made that each interconnection is one which is traversable by the alternating signal components which are inherently present in the oscillator's tuning circuits.

It will now be understood that forthwith upon closure of switch 13 the tone-dialing oscillator TDO will be tuned automatically for three successive units of time (each unit typically of 100 milliseconds) to the respective three pairs of frequencies which in succession denote the preselected telephone address "569," and correspondingly that forthwith upon closure of switch 23 that oscillator will be tuned automatically for three successive units of time to the respective three pairs of frequencies which in succession denote the preselected telephone address "790." Thus in a broad sense there have already been disclosed both the structure and the operation of apparatus accomplishing a primary objective of the invention. It should be noted, however, that in the interest of providing a general understanding of the overall operation at this, the earliest practicable point herein, the foregoing description has omitted attention to several matters to which it is desirable to attend and detailed aspects of operation which it is desirable to understand, as well as certain optional features —all of which will now be dealt with.

For the apt functioning of the tone-dialing oscillator TDO its abovementioned contacts X must be closed—and, because conventional tone-dialing practice contemplates that the successive tone outputs from the oscillator will be each of approximately 50 milliseconds and will be separated each from its predecessor by an interval of approximately 50 milliseconds, this closure should be limited to a fraction only of each of the 100-millisecond units of time last mentioned above. To accomplish this limitation there are provided means, timed by the pulse generator in multiple with the stepping switch SS, for periodically activating and deactivating the oscillator. Such means may comprise a relay 88 (see FIGURE 3) of which the normally open contacts X of the oscillator TDO form a part and whose coil—connected for example across a pair of terminals 86 on the oscillator—may be supplied with current under the control of the pulse generator. Thus (see FIGURE 1) there may be provided an n-p-n transistor 85 whose emitter may be connected to negative supply potential and whose collector may be connected to unregulated positive supply potential via the terminals 86 so that, when flowing, the transistor's collector current will actuate the relay 88. The base of the transistor 85, which may be connected to negative supply potential through an appropriate resistor 84, may be connected to the output terminal 541 of the pulse generator, preferably through one or more voltage-dropping diodes 83. Thus basically the transistor 85 will be rendered conductive, and its collector current caused to flow, only during the 50-millisecond pulses throughout which terminal 541 is substantially positive; the oscillator TDO will accordingly be activated essentially at the onset, and will be deactivated essentially at the termination, of each of those pulses.

As has been pointed out by others in connection with a tone-dialing oscillator such as TDO, it is desirable that the tuning of the oscillator which is to prevail during any tone output thereof have already been established at the instant of activation of the oscillator. To accomplish this in the present apparatus there may be interposed between the pulse generator PG and the relay 88—preferably between terminal 541 and the diodes 83—a delay circuit, comprising for example a series resistor 81 and a shunt capacitor 82, which retards for a few milliseconds or so the operation of the relay 88 relative to the onset of the pulse at terminal 541.

In the early description of the tone-dialing oscillator there were disclosed (along with their functions) three pairs of contacts Z, V and U normally closed but opened during actual operation of the oscillator. These pairs of contacts may form parts of a relay 87 whose coil may be connected in parallel with that of relay 88, so that the opening and closing of these contact pairs may occur simultaneously with the closing and opening of the contact pair X of the latter relay. Another detail with respect to the contacts and relays is that across the paralleled coils of the relays there may desirably be shunted a transient-absorbing diode 89, in accordance with well-known relay practice.

Attention may now be re-directed to the address selector CS and its operation. In the earlier description thereof there was not indicated the manner in which there might be accomplished the extinguishment of any fired one of the SCS's therein at the conclusion of the operation of the stepping switch SS invoked by the firing of that SCS. One manner of effecting that extinguishment which I have employed is the capacitative impression, on the junction between resistor 61 and diode 62, of a strong negative pulse derived from the rise of potential of the conductor K at that conclusion—that impression momentarily interrupting the flow of current through that diode to the conductor J; this manner, however, exhibits the conceivalbe disadvantage that if through any conceivable mischance (such as a fortuitous manipulation of one of the switches 13, 23, etc. at a critical instant) a channel-selector SCS become fired after the stepping switch SS has concluded its operation but without re-invoking such operation, then there would be no subsequent rise of conductor-K potential on which to rely for the action.

Preferable for the performance of this extinguishing function is the use of an n-p-n transistor 90 whose emitter may be connected to negative supply potential and whose collector may be connected to the junction between the abovementioned resistor 61 and diode 62. To the base of the transistor 90, which itself may be connected to negative supply potential through a resistor 93, there may be made a connection from the conductor K through a resistor 91 and one or more voltage-dropping diodes 92.

It is true that in the quiescent condition of the apparatus, when the conductor K has a substantial positive potential, the transistor 90 will be conductive and the path 61–62 thus disabled from supplying current to the conductor J, but as above noted the path 64–63 supplies sufficient current to that conductor to permit firing (even though not holding fired) of any one of the selector unit SCS's—and the above-described dropping of potential of the conductor K forthwith upon that firing, since it renders the transistors 90 non-conductive, removes the disabling influence from the path 61–62. Obviously the disabling influence will be re-imposed by the transistor 90 when the conductor-K potential rises at the end of the stepping-switch sequence, with the intended effect of extinguishing any address selector SCS which at that time is standing fired.

It may be noted that even though the selector unit switch (e.g. 13, 23, 33) associated with that SCS be still held closed this extinguishment will not be followed by a refiring of that SCS—for the associated capacitor (e.g. 15, 25, 35) will then not yet have been permitted to readjust its charge so as to be again capable of invoking the firing of that SCS.

While obviously each of the third and fourth selector units 32 and 42 may be used (in a manner quite analogous to that disclosed for each of the selector units 12 and 22) in the tone-dialing of respective third and fourth preselected telephone address (analogous to the typical "569" and "790"), they have instead been shown as used together in the tone-dialing of a telephone address of more than *d* (e.g. more than three) digits. For this purpose (as already noted) the switch of earlier selector units has in selector unit 42 been replaced by a resistor 43; to the junction joining 43 with the network 44 there may be connected from the anode gate of the third unit SCS 37 a diode 39 poled to conduct positive current toward that anode gate. The result of these connections it that while the third-unit SCS 37 remains fired (during a stepping-switch sequence previously initiated by the closure of switch 33) the then-low potential of its anode gate will effect the essential discharge of the input capacitor 45 of the fourth selector unit—but that when that anode-gate potential abrouptly rises on extinguishment of the SCS 37 the charging of that capacitor 45 will result in a substantial drop across resistor 46 and the momentary application to the cathode gate of the fourth-stage SCS 47 of a pasitive potential, to result in turn in the firing of that SCS 47 and an activation of the address conductor 40 in response to the extinguishment of the SCS 37 or the deactivation of the address conductor 30.

Coincidentally the abrupt rise of potential of the 43–44 junction incident to SCS–37 extinguishment may be applied to the cathode gate of the first-stage SCS 51 of the stepping switch SS, to initiate an automatically repeated operation of that switch immediately following the conclusion of the one which had been invoked by switch- 33 closure, through an appropriate network 49. This network 49 may for example comprise a resistor 49*a*, capacitor 49*b* and resistor 49*c* connected serially from the 43–44 junction to negative supply potential, and a diode 49*d* connected from the 49*b*–49*c* junction to the SCS–51 cathode gate.

Let it be assumed that the telephone address in whose tone-dialing the third and fourth address conductors are to be jointly used has a number $d+1$ (e.g. four) of digits—by way of arbitrary example, that it is the telephone address "1327." The third address conductor may be used in the tone-dialing of the first three digits "132," and accordingly path 133 will be connected to conductor W1 and 134 to G1, path 233 will be connected to conductor W1 and 234 to G3, and path 323 will be connected to conductor W1 and 334 to G2. The fourth address conductors may be used in the tone-dialing of the fourth digit "7," and accordingly path 143 will be connected to conductor W3 and 144 to G1.

It will now be understood that upon closure of the switch 33 actions will occur in smooth succession as follows: (i) the SCS 37 will be fired and while it so remains "'132" will be tone-dialed, and (ii) the SCS 47 will be fired and in the first 100 milliseconds (usefully, in the first 50 milliseconds) thereafter the remaining digit "7" will be dialed. Obviously if the remainder of the telephone address to be tone-dialed by the third and fourth address conductors jointly had been of a full *d* (e.g. three) digits, then appropriate connections would have been made of paths 243, 244, 343 and 344 and a full 2*d*-digit number would have been tone-dialed.

In the $d+1$-digit (e.g. 4-digit) example just given there remain, after the desired telephone address has been tone-dialed, 200 milliseconds of operation of the stepping switch, during which two further pulses will be generated at the terminal 541 and the oscillator TDO (in the absence of measures to the contrary) will be twice more activated and deactivated. During such further activations the oscillator would not produce any of its normal tone outputs, in view of the non-connection of paths 243, 244, 343 and 344 with any one of the W and G conductors—but it may generate, to the annoyance of the user (who may hear in his earpiece E) and may send out over the telephone line connected to terminals $N_1$ and $N_2$ (to the possible detriment of the functioning of remote apparatus) an arbitrary high-pitched tone output. Positively to preclude this I have found it desirable to incorporate muting arrangements which disable the oscillator from generating any tone output during the further pulse or pulses remaining after the intended telephone address has been tone-dialed. Obviously such arrangements would also be desirable in a case wherein one of the uncombined address selector units (e.g. 12 or 22) was desired to be used in the tone-dialing of a telephone address of less than *d* digits.

The muting arrangements may be incorporated in the interconnection-establishing means CB, in which for example there may be included an eight conductor M arranged ot be connectible at will to appropriate ones of the path 111, 112, 211 . . . 344. In the particular circuitry disclosed herein it is sufficient, in order to provide for the muting of any digit of the telephone address commanded by any address conductor, to make the conductor M connectible either to any odd-numbered or to any even-numbered one of those paths; in FIGURE 1 it is shown as connectible to any even-numbered one.

While the apparatus whose action is controlled by the muting conductor M may take any of a variety of forms, I have found particularly advantageous one in which (i) the disabling of the oscillator is effected by forestalling the closure of the oscillator's contacts X, for example by disabling of the relay 88 which would otherwise close them, and (ii) the connection of the conductor M to disable the oscillator during closure of any one of the paths will also disable the oscillator during any remainder, after such closure, of the usual sequence of digit—conductor (e.g. 1, 2, 3) activation.

For this purpose there may be employed an SCS 100, whose anode gate may be connected with its anode through a resistor 98, whose anode may be connected to regulated positive supply potential through a resistor 99, and whose cathode may be connected to negative supply potential. Between the cathode gate of SCS 100 and negative supply potential there may be connected the secondary of a pulse transformer 94, so that the SCS 100 will be fired upon the passage of a pulse through the primary of that transformer. That primary may be connected between the conductor M and a point in the oscillator TDO having, under conditions of non-operation of the relays 88–87, a D.C. potential substantially different from that of the junction between tertiaries A''' and B'''—for example to the terminal $N_3$ mentioned early above. If now the terminal H0 be at any time connected to the conductor M, then the oscillator capacitor C*b* will be charged, from the potential of that point, through the primary and a pulse will be passed through the primary to fire the SCS 100.

If a connection has previously been made, as illustrated, between path 244 and conductor M, then when the stepping switch SS completes at 271 the closure of the path 244 during the sequence invoked by the firing SCS 47—i.e. at the completion of the first 100 milliseconds of that sequence, at which time the tone-dialing of the typical telephone address "1327" has already been completed—a momentary pulse will be passed through the primary of transformer 95, and the resulting pulse across the secondary will fire the SCS 100.

The base circuit of the transistor 85, preferably at the junction between diodes 83 and resistor 81, may be clamped down to the anode of the SCS 100 through a diode 97, with the result that while the SCS 100 stands fired the transistor 85 will be rendered incapable of being made conductive, the relays 88 and 87 forestalled from operating, and the oscillator TDO thus kept diabled. This state of affairs, being initiated at the time last specified in the preceding paragraph, arises in ample time, in view of the delay circuit 81–82, to render wholly ineffective on the oscillator the second pulse of the sequence; since the SCS 100 will still remain fired, it renders the third pulse likewise ineffective—without requiring any connection between path 344 and conductor M.

The SCS 100 must of course be extinguished at the conclusion of the sequence—for which purpose advantage may be taken of the fact that at that conclusion the potential of the conductor K abruptly rises. Thus from that conductor to negative supply potential there may be connected a circuit serially comprising a diode 101 and two resistors 102 and 103, and to the junction between those resistors there may be connected the base of an n-p-n transistor 105 whose emitter may be connected to negative supply potential. The collector of the transistor 105 may be supplied with current from regulated positive potential through a resistor 107 and diode 106, and a capacitor 108 may be connected from the junction joining that resistor and that diode to the anode of the SCS 100.

During any sequence of operation of the stepping switch SS the conductor K will be at a low potential, the transistor 105 non-conductive, and the lefthand plate of capacitor 108 therefore at essentially regulated positive supply potential. But when at the conclusion of the sequence the potential of conductor K a bruptly rises the lefthand plate of capacitor 108 will be abruptly brought down almost to negative supply potnetial through the diode 106 and the abruptly-dropping impedance of the collector-to-emitter path of transistor 105, and a strong negative pulse will be applied by the capacitor 108 to the anode of the SCS 100 to extinguish the latter. (If it were desired to extinguish the fired one of the selector unit SCS's capacitatively that could be done in an entirely analogous manner.)

Advantage may be taken of the transistor 105, which is of course quiescently conductive, to perform the function, mentioned early above as needing performance, of foreclosing any momentary conudctivity of the transistor 80 at the onset of an initial pulse from the pulse-generator terminal 541. Thus across the serially connected resistors 102–103 there may be connected a capacitor 104 which, although it can charge essentially instantaneously through the diode 101 upon sudden rise of the potential of conductor K, will discharge relatively slowly (e.g. over a period of many milliseconds) upon sudden fall of that potnetial—with the result that the fall of potential of conductor K which occurs at the onset of the first pulse only of a sequence will occur before there has been time for the transistor 105 to become non-conductive. The base circuit of the transistor 80, preferably at the junction between capacitor 74 and diode 76, may be clamped down to the collector of transistor 105 through a diode 109, thus foreclosing any momentary conductivity of 80 at the onset of the first pulse.

In connection with the transistor 80 there will be noted in FIGURE 1 a circuit consisting of a capacitor 78 and a ressitor 79 connected between its base and regulated positive supply potnetial. This has been found desirable to foreclose the possibility of transistor 80 being rendered momentarily conductive (and the potential of conductor K thus momentarily reduced) as an incident to connection of the apparatus to its source of D.C. potnetial (i.e. to change of the condition of the apparatus from wholly off to quiescent).

In telephone practice it is considered desirable to test any tone-dialing oscillator from time to time to verify the operativeness and pitch of its individual-frequency outputs. In thus testing the oscillator TDO it is necessary (i) that the relays 87 and 88 be temporarily kept operated, (ii) that during the testing of any low-frequency output no high-frequency output take place and vice versa, and (iii) that a connection be established from terminal L0 or H0, as the case may be, to the individual L or H terminal appropriate to the individual-frequency output being tested.

To provide for the most convenient accomplishment of (iii) the conductors 403 and 404 may be provided with respective branches 413 and 414, in the interconnection-establishing means CB there may be provided four connection points at each of which the conductor branch 413 may be connected to a respective one of the W conductors, and in that means CB there may be provided three connection points at each of which the conductor branch 414 may be connected to one of the G conductors—it being understood that, (i) and (ii) being meanwhile appropriately accomplished, any one such connection will elicit from the oscillator a respective one of its individual-frequency tone outputs. To accomplish (i) the upper-shown one of the terminals 86 may be temporarily connected to negative supply potential. To accomplish (ii) while testing any low-frequency component the conductor 414 may be connected to any two of the G conductors, thereby shorting some part of the tertiary B‴; to accomplish (ii) while testing any high-frequency component the conductor 413 may be connected to any two of the W conductors, thereby shorting some part of the tertiary A‴.

Typical internal circuitry for the pulse generator PG is shown in FIGURE 2. It may be powered by the same supply as that used for the apparatus previously described; it may include a voltage divider formed by resistors 531 and 532 serially connected between regulated positive supply potential and negative supply potential, at the intermediate point 533 of which there may be made available a positive potential of a little over half of regulated positive supply potential.

The pulse generator may for example comprise two n-p-n transistors 501 and 502, the emitter of 501 being connected through a resistor 525, and that of 502 being connected directly, to negative supply potential; the collectors of 501 and 502 may be connected to regulated positive potential through respective resistors 509 and 510.

The bases of transistors 501 and 502 may be connected to negative supply potnetial through respective resistors 505 and 506, which may be shunted by respective diodes 507 and 508 each poled to conduct current toward the respective transistor base; those bases may also be connected to the intermediate-potential point 533 through respective circuits 503–519 and 504–520 each serially comprising a capacitor and a diode poled to conduct current toward that point. The junction joining capacitor 503 and diode 519 may be connected to regulated positive supply potential through the serial combination of a high-valued fixed resistor 511 and a lower-valued variable resistor 513, and that junction may also be connected to the collector of transistor 502 through a circuit comprising serially a resistor 515 and a diode 517 poled to conduct current toward that collector; the junction joining 504 and 520 may be connected to regulated positive supply potential through the serial combination of a high-valued fixed resistor 512 and a lower-valued variable resistor 514, and that junction may also be connected to the collector of transistor 501 through a circuit comprising serially a resistor 516 and a diode 518.

A one-stage amplifier is provided by a transistor 521 whose emitter is connected to negative supply potential, whose base is connected to the emitter of 501, and whose base-to-emitter path (rather than the resistor 525) is the principal avenue for the emitted current of 501. The collector of transistor 521 is connected to regulated positive supply potential through a resistor 529. The output terminals of the pulse generator and amplifier are constituted by 541 connected to the collector 521, and 542 connected to negative supply potential. It will be understood that when the transistor 501 is conductive so likewise will be the transistor 521 and that the potential of terminal 541 will then be little above negative supply potential; quiescently it is this state of affairs which is mantained—by the applicaton, already described, of a positive potential to the squelch terminal 543, which in turn is connected to the base of the transistor 501.

The conductivity of transistor 501 during the squelched condition places the collector of that transistor at near negative supply potential; the circuit 516–518 then maintains the righthand plate of capacitor 504 at a similar potential, while the resistor 506 maintains the lefthand plate of that capacitor at negative supply potential—i.e. that capacitor is essentially discharged. Transistor 502 will be non-conductive and its collector at essentially regulated positive supply potential; this renders the circuit 515–517 ineffective, and a steady small current will flow through resistors 511 and 513 and diode 519 to the point 533, placing the lefthand plate of capacitor 503 at substantially the intermediate potential of that point—i.e. that capacitor will stand charged. When the pulse generator is de-squelched by the removal of any substantial positive potential from terminal 543 the transistor 501 will forthwith assume a non-conductive condition, with effects as follows:

The assumption of non-conductive condition by transistor 501 renders ineffective the circuit 516–518, noted above to have been maintaining the righthand plate of capacitor 504 at near negative supply potential, accordingly permitting the charging of that capacitor (righthand plate positive) through and at a rate controlled by the resistors 512–514 and through the input path of transistor 502 which is then rendered conductive by the charging current. The conductivity of 502 drops its collector potential to near negative supply potential, invoking the rapid discharge of capacitor 503 through the circuit 515–517, transistor 502 and diode 507, after which the circuit 515–517 will maintain the lefthand plate of capacitor 503 at near negative supply potential and that capacitor essentially discharged. The conductivity of transistor 502 will continue until capacitor 504 has been charged to the intermediate potential of point 533, whereupon further charging is abruptly foreclosed by the diode 520 diverting the current flow from that capacitor to the point 533. The cessation of charging causes transistor 502 forthwith to assume a non-conductive condition.

The assumption of non-conductive condition by transistor 502 will invoke an action, including conduction by transistor 501, identical with that described in the preceding paragraph excepting for the interchange of lefthand and corresponding righthand components. At the conclusion of that action transistor 501 will again become non-conductive, reinvoking the action just as described in the preceding paragraph—and so on in a continuous alternation continuing until the pulse generator is resquelched. Throughout the odd-numbered half-cycles of this alternation the amplifying transistor will be nonconductive and the terminal 541 thus at essentially regulated positive potential—that terminal being at near negative supply potential during the even-numbered halfcycles as well as quiescently.

It will be observed that in the squelched condition the components of the pulse generator are maintained in substantially the same condition as that in which they will be at the very end instead of any even-numbered half-cycle, with the results (i) that the first half-cycle following de-squelching will invariably be one of conductivity of transistor 502, and (ii) that the duration of that first half-cycle will be essentially no different from that of any subsequent odd-numbered half-cycle. By adjustment of the variable resistors 514 and 513 there may be controlled within limits the durations of the odd- and even-numbered half-cycles, respectively—i.e. the durations of the positive pulses at terminal 541 and of the inter-pulse intervals, respectively, each of which durations was above postulated to be approximately 50 milliseconds.

In review of the earlier description above, there are *d* (specifically three) digit conductors (i.e. 1, 2 and 3); *c* (specifically four) addresses conductors (i.e. 10, 20, 30 and 40) selectively activatable by respective switches (i.e. 13, 23 etc.); *ncd* (specifically twenty-four, *n* being two) normally open electrical paths (i.e. 113, 114 . . . 344) under the control of the digit conductors and the address conductors, each combination of one digit conductor and one address conductor when contemporaneously activated effecting the closure of a respective *n* (specifically two) of the paths (e.g. the combination of digit conductor 1 and address conductor 10 when contemporaneously activated effecting the closure of the two paths 113 and 114); means, actuated as an incident to the activation of one of the address conductors, for sequentially activating the digit conductors in a predetermined sequence (e.g. 1, 2, 3) thereby successively to close, *n* (specifically two) at a time, *nd* (specifically six) of said paths; and terminal-interconnecting means (i.e. the W and G conductors), with which the paths are selectively connected (within CB) to render those terminal-interconnecting means effective in accordance with closures of those paths, for establishing preselected interconnections of the electrical-system terminals L0 through L4 and H0 through H3.

In compact review of the function of the apparatus, the closure (either momentary or longer) of the switch (e.g. 13 or 23) of one of the selector units (e.g. 12 or 22) will result forthwith in the automatic tone-dialing of the telephone address which in the interconnection-establishing means CB has been preselected, or programmed, for the associated address conductor (e.g. the above-mentioned designation "569" in the case of address conductor 10, or "790" in the case of address conductor 20). This tone-dialing will be completed in approximately $(d-\frac{1}{2})\times 100$ milliseconds (e.g. in approximately 250 milliseconds in the illustrated case wherein *d* equals three). If a pair of selector units (as illustrated for the pair 32–42) be interconnected for the tone-dialing of a telephone address of a greater number of digits, then the closure of the switch (e.g. 33) of the first unit of that pair will result forthwith in the automatic tone-dialing of the telephone address which has been preselected, or programmed, for the pair of associated address conductors (e.g. the address "1327," whose tone-dialing will be completed in approximately 350 milliseconds).

As has been brought out above, the illustration of the number *c* of addresses as four and of the number *d* of digits as three is purely typical, and in practice other and usually larger numbers of addresses or digits or both may and usually will be used. It is interesting to note that even though the number of digits be increased to seven, which is of course a very common choice, the tone-dialing of any full seven-digit telephone address will be completed in approximately 650 milliseconds—i.e. in less than two-thirds of one second, and this in response to the merely momentary closure of a single switch, and with no possibility of erroneous deviation from the sequence of integers which has been preselected, or programmed, for that switch.

It will of course be understood that the preselection, or programming, for any address conductor may be changed from time to time as the needs or desires of the user may dictate—such change requiring merely the alteration of the connections of the paths for that address conductor within the interconnection-establishing means CB.

FIGURES 1 through 3 and the foregoing detailed description have disclosed the invention in a preferred embodiment in which the electrical system is the tone-dialing oscillator TDO, with which is has various special utilities already made apparent. In its broader aspects, however, the invention is not limited to use in connection with a system of that particular form. By way of example FIGURE 4, which is intended for optional substitution for the righthand portion of FIGURE 1, illustrates the invention in an embodiment wherein the electrical system for the transmission of a number of respective-integer-representing signals, designated generally as ES, is of a quite different type—i.e. of the general type schematically shown in FIGURE 6 (supplemented by various preceding figures) of an article by B. H. Geels and N. Scheffer appearing in Philips Telecommunication Review, vol. 17, No. 1, August 1956 at pages 3 et seq. and is described in that article and in other material to which it makes reference.

Figure 4:
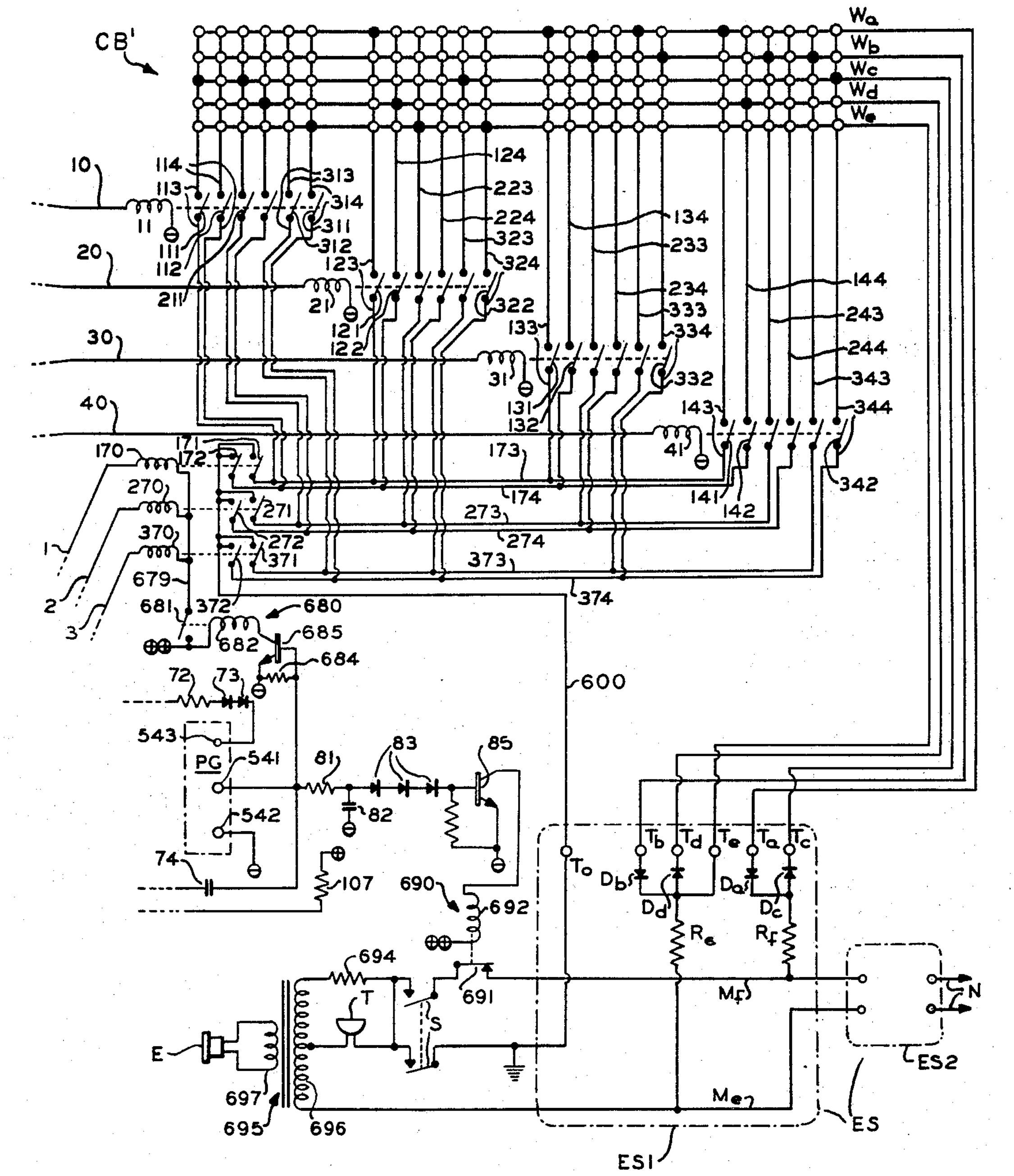
FIGURE 4 is a schematic diagram of another form of the electrical system above referred to, together with portions of the automatic dialing apparatus (such as shown in FIGURE 1) modified appropriately to the different form of electrical system.

In FIGURE 4 the electrical system ES includes a portion ES1 comprising a number (typically six) of variously interconnectible terminals $T_o$, $T_a$, $T_b$, $T_c$, $T_d$, and $T_e$, of which $T_o$ is grounded, and of which $T_b$, $T_d$ and $T_e$ are connected—$T_b$ and $T_d$ first through respective oppositely poled diodes $D_b$ and $D_d$—through a common resistor $R_e$ to one conductor $M_e$ of a two-conductor line, and of which $T_a$ and $T_c$ are connected through respective oppositely poles diodes $D_a$ and $D_c$ and through a common resistor $R_f$ to the other conductor $M_f$ of that line. (A seventh terminal which would have been provided for diodeless connection to resistor $R_f$ in a fuller analogy to FIGURE 6 of the article is absent because unnecessary.) The system ES also includes a portion ES2 into which that line is connected, which includes suitable sources of power, which registers the sequence of integers signalled by successively established interconnections of the terminals, and which appropriately transmits (e.g. over a line N) corresponding successive integer-representing signals of a nature not herein of importance. With the system ES1 the transmitter T and receiver or earphone E of the telephone set are appropriately integrated. Thus. the line conductor $M_f$ may be connected through normally closed relay contacts 691 hereinafter mentioned, through one of the sets of contacts of the cradle switch S and through a resistor 694 to one extremity of the primary 696 of a transformer 695; the other line conductor $M_e$ may be connected directly to the other extremity of the primary 696; the earphone E may be connected across the secondary 697 of the transformer 695; and the transmitter T may be connected from the mid-point of the primary 696 both to the lineward extremity of resistor 694 and, through another of the sets of contacts of the cradle switch S, to ground.

The general manner of functioning of this apparatus is made apparent by the article last above referred to—on the basis that for the transmission of signals respectively representing the several integers 1 through 9 and 0 the following interconnections of the terminal will be made:

| For the integer: | Interconnection between $T_o$ and |
|---|---|
| 1 | $T_a$ |
| 2 | $T_a$ and $T_b$ |
| 3 | $T_b$ |
| 4 | $T_b$ and $T_c$ |
| 5 | $T_c$ |
| 6 | $T_c$ and $T_d$ |
| 7 | $T_a$ and $T_d$ |
| 8 | $T_a$ and $T_e$ |
| 9 | $T_e$ |
| 0 | $T_c$ and $T_e$ |

First it will be understood that for the transmission of various integer-representing signals from the electrical system ES the apparatus according to the invention must in this embodiment effect terminal interconnections according to the immediately preceding tabulation. As a secondary function, for reasons brought out in the article last above referred to, the normally closed contacts 691 should be opened a few milliseconds after any particular integer-representing interconnection of the terminals and should remain open during the remaining period of that interconnection. As a tertiary function the periods during which successive particular interconnections of the terminals are effected should be separated by appreciable intervals. FIGURE 4 shows the modifications of the apparatus of FIGURE 1 appropriate to these functions; from FIGURE 4 there are omitted, in the interest of simplicity, muting arrangements such as shown in and described in connection with FIGURE 1, though they could be incorporated if desired.

In FIGURE 4, in full correspondence with FIGURE 1, there appear the digit conductors 1, 2, and 3; the address conductors 10, 20, 30 and 40; the $2cd$ (e.g. twenty-four) pairs of contacts 111, 112 . . . 341, 342 respectively included in the $2cd$ paths 113, 114 . . . 343, 344, a respective $2d$ of those contact pairs forming parts of a respective one of the relays 11, 21, 31 and 41 therethrough to associate their respective paths with a respective one of the address conductors 10, 20, 30 and 40; the $2d$ (e.g. six) common conductors 173, 174, 273, 274, 373 and 374 each included in a respective $c$ of the paths; and the $2d$ pairs of contacts 171, 172, 271, 272, 371 and 372, a respective two of those contact pairs forming parts of a respective one of the relays 170, 270 and 370 therethrough to associate their respective paths with a respective one of the digit conductors 1, 2 and 3. From the $2d$ contact pairs 171 . . . 372 a common conductor 600 may connect all the $2cd$ paths to the electrical-system terminal $T_o$.

In FIGURE 4 the interconnection-establishing means CB of FIGURE 1 is replaced by a generally similar means CB′ comprising five conductors $W_a$, $W_b$, $W_c$, $W_d$ and $W_e$ respectively connected to the terminals $T_a$, $T_b$, $T_c$, $T_d$ and $T_e$ (replacing the four conductors W1 through W4 and the three conductors G1 through G3 of FIGURE 1), and $10cd$ interconnection points each providing for the connection of one of those five conductors with one of the $2cd$ (e.g. twenty-four) paths 113, 114 . . . 343, 344 abovementioned—it being now contemplated that any one of those paths may be connected to any one of the conductors $T_a$ through $T_e$ by an actual connection at the point wherein FIGURE 4 that path crosses that conductor.

The paths 113 and 114, being a pair for the determination of the integer which expresses the first digit of the telephone address for which the first address conductor is programmed, will be connected to the one conductor or two conductors which is or are appropriate to that integer; if that integer be "5" it is sufficient that one of those two paths be connected to the conductor $W_c$ (the other being left unconnected or, harmlessly, connected to that same conductor). The paths 213 and 214, being a pair for the determination of the integer which expresses the second digit of that telephone address, will be connected to the conductor or conductors appropriate to that integer; if that integer be "6" one of those two paths will be connected to the conductor $W_c$ and the other to the conductor $W_d$. Correspondingly the circuits 313 and 314 will be connected to the conductor or conductors appropriate to the integer expressing the third digit; if that integer be "9" one of those two paths will be connected to the conductor $W_e$ (the other being left unconnected or, harmlessly, similarly connected).

The paths 123–124, 223–224 and 323–324, for the successive integers of the telephone address for which the second address conductor is programmed, will be connected according to similar principles—and so on. FIGURE 4 by way of example shows the second address conductor programmed for the telephone address "790", the third programmed for "132" and the fourth programmed for "734". In the manner thus outlined there is performed the primary function of effecting the required terminal interconnections.

The secondary function of opening the normally closed contacts 691 a few milliseconds after any particular integer-representing interconnection of the terminals may be performed with the aid of the transistor 85, which is rendered conductive, just as in FIGURE 1, a few milliseconds after the inception of each 50-millisecond pulse from the pulse generator PG. That transistor, since its FIGURE-1 function as such does not need to be performed with the electrical system ES, may in FIGURE 4 be diverted to the function of opening contacts 691; for this purpose its collector may be connected to, and may control the current through, the coil 692 of a relay 691 of which the contacts 691 form a part.

The tertiary function of separating by appreciable intervals the periods during which successive particular interconnections of the terminals are effected may be performed with the aid of an n-p-n transistor 685 whose emitter may be connected to negative supply potential, whose base (connected through a high-valued resistor 684 to that emitter) may be connected to the pulse-generator terminal 541, and whose collector may be connected to and may control the flow of current through the coil 682 of a relay 680 (the other end of that coil being connected to a positive supply potential). The relay 680 may have normally open contacts 681 interposed in series with the common conductor 679 through which current is supplied to the coils of relays 170, 270 and 370; the result of this arrangement is that each of those relays can be operated only during an actual pulse from the pulse generator—i.e. will be operated throughout the first 50 milliseconds only of the 100 milliseconds throughout which it would otherwise be operated, the remaining 50-milliseconds becoming an interval between periods of successive particular interconnections of the terminals. This action also rounds out the performance of the secondary function of the preceding paragraph, by bringing each particular interconnection of the terminals to an end before the contacts 691 are re-closed.

While I have illustrated and described my invention in terms of a particular embodiment thereof, it will be understood that I intend thereby no unnecessary limitations. Modifications in many respects will be suggested by my disclosure to those skilled in the art, and such modifications will not necessarily constitute departures from the spirit of the invention or from its scope, which I undertake to define in the following claims.

I claim:

1. In combination with an electrical system for the selective transmission of a number of respective-integer-representing signals, which system includes a plurality of variously interconnectible terminals, the interconnection of said terminals determining the transmitted signal: *d* (*d* being a plural integer) digit conductors; *c* (*c* being a plural integer) selectively activatable address conductors; *ncd* (*n* being an integer) normally open electrical paths under the control of said digit conductors and said address conductors, each combination of one digit conductor and one address conductor when contemporaneously activated effecting the closure of a respective *n* of said paths; means, actuated as an incident to the activation of one of said address conductors, for successively activating the digit conductors in a predetermined sequence thereby successively to close, *n* at a time, *nd* of said paths; and terminal-interconnecting means, with which said paths are selectively connected to render those terminal-interconnecting means effective in accordance with closures of those paths, for establishing preselected interconnections of said terminals.

2. The subject matter claimed in claim 1 wherein said electrical system is a tone-dialing audio-frequency oscillator, wherein the interconnection of said terminals determines the oscillator's tone output, and wherein said terminal-interconnecting means are traversable by alternating signal components.

3. The subject matter claimed in claim 2 wherein said terminals comprise *s* (*s* being a plural integer) sets each of a plurality of variously interconnectible terminals, and wherein *n* equals *s*.

4. The subject matter claimed in claim 1 wherein each of said last-mentioned interconnections serially includes one of said paths.

5. The subject matter claimed in claim 1 further including means, connected with said digit-conductor-activating means and responsive to the completion of operation thereof, for de-activating the previously activated address conductor.

6. The subject matter claimed in claim 1 further including means for de-activating the previously activated address conductor after the successive activation of said digit conductors and means connected with, and responsive to the de-activation of, that address conductor for activating another of said address conductors.

7. The subject matter claimed in claim 2 further including means to which a selected one of said paths may be connected for disabling the oscillator during the closure of that selected path.

8. The subject matter claimed in claim 2 further including means to which a selected one of said paths may be connected for disabling the oscillator both during the closure of that selected path and during any remainder, after such closure, of said sequence of digit-conductor activation.

9. The subject matter claimed in claim 2 further including a pulse generator, and wherein said means for successively activating said digit conductors comprises electronic-stepping-switch means timed by said pulse generator.

10. In combination with a tone-dialing audio-frequency oscillator which includes a plurality of variously interconnectible terminals, the interconnection of said terminals determining the oscillator's tone output: a plurality of digit conductors; a pulse generator; a stepping switch, operatively connected with and timed by the pulse generator, for activating the digit conductors in a predetermined sequence; means for establishing preselected interconnections of said terminals, said interconnection-establishing means being controlled by said digit conductors to establish a respective such interconnection as an incident to the activation of each digit conductor; and means, operatively connected with and timed by the pulse generator, for periodically activating and de-activating the oscillator.

11. The subject matter claimed in claim 10 further including means, operatively interposed between said pulse generator and said oscillator-activating and -deactivating means, for retarding the timing of the latter relative to that of said stepping switch.

12. The subject matter claimed in claim 10 wherein said oscillator-activating and -deactivating means is operatively connected with and timed by said pulse generator in multiple relationship to said stepping switch.

13. The subject matter claimed in claim 12 further including means, operatively interposed between said pulse generator and said oscillator-activating and -deactivating means, for retarding the timing of the latter relative to that of said stepping switch.

14. The subject matter claimed in claim 10 further including means for shock-exciting said oscillator at the times of its activation.

15. The subject matter claimed in claim 10 further including a telephone transmitter element locally connected with said oscillator, and means for incapacitating said transmitter element during the periods of activation of said oscillator.

16. The subject matter claimed in claim 10 further including a telephone receiver element locally connected with said oscillator, and means for attenuating the action of said receiver element during the periods of activation of said oscillator.

References Cited

UNITED STATES PATENTS 3,301,967 1/1967 Plyer ---------------- 179—90

KATHLEEN H. CLAFFY, *Primary Examiner.*

A. H. GESS, *Assistant Examiner.*